3,215,599
PROCESS FOR PREPARING POLYMER WAX-MODIFIED PETROLEUM OIL UNCTUOUS BASE
Paul Thau, Westfield, and Charles Fox, Fair Lawn, N.J., assignors to Warner-Lambert Pharmaceutical Company, Morris Plains, N.J., a corporation of Delaware
No Drawing. Filed July 2, 1963, Ser. No. 292,444
12 Claims. (Cl. 167—63)

This invention relates to a method of making high viscosity products having a liquid petroleum oil base and to the products so formed. More particularly, the invention relates to a method of making an unctuous base composition by modifying petroleum oils with certain polymer waxes homogeneously blended therein and to the products so formed.

It has long been known that an amorphous wax fraction exists in petrolatum which exerts a profound effect upon the gel structures formed by the crystalline paraffin wax portion thereof. However, past attempts to gel mineral oil with amorphous wax alone has resulted in a thickened oil having little utility as an ointment base composition. The high degree of compatibility between the wax and the oil yields a thick, heavy, stringy mass, and large amounts of wax have been required to reach a proper viscosity range typical of ointment bases. In contrast, an almost opposite result is obtained by dissolving paraffin alone, which is completely crystalline, in hot mineral oil and allowing it to congeal. A granular mixture results by this process with practically no gel structure and as a consequence, the product so produced is neither smooth nor homogeneous. Therefore, neither amorphous wax alone nor paraffin wax alone produces a desirable gel when employed to modify mineral oil. These observations suggest that a macromolecular hydrocarbon containing both crystalline and amorphous fractions would be most suitable as a gelling agent for producing a mineral oil gel having the characteristics most desired in ointment bases and the like.

Polyethylene is a hydrocarbon containing both crystalline and amorphous fractions which has been found suitable for use as a gelling agent for mineral oil to form unctuous base compositions useful in the preparation of ointments, salves, cosmetic creams and the like.

One process directed to the modification of mineral oil by polyethylene is disclosed in Frohmader et al., U.S. Patents Nos. 2,627,938 and 2,628,187. Generally, the invention disclosed therein is based on the discovery that rapid cooling of a molten polyethylene-oil solution results in a thickening effect such that a thin mineral oil is converted into a thick paste by addition of as little as 2% polyethylene. The average molecular weight of the polyethylene used is from 3,500 to over 26,000, preference being indicated for the 18,000 to 20,000 range. This process, however, has limited utility in that the preferred polyethylene gelling agent must be of relatively high molecular weight which requires high processing temperatures for melting the materials. These high temperatures combined with rapid cooling greatly limit the type of active materials which may be added to the processed mixture. Additives which are modified or destroyed either by heating or sudden cooling cannot be employed.

Finally, the many drawbacks inherent in mixing petroleum oil and polymer waxes by conventional mixing procedures are well known. Generally, the product forms a very poor gel having little or no stability with a great tendency for the oil to separate from the polymer waxes. Further, with conventional mixing, it is difficult to reproduce the product to a consistent quality standard.

It has now been found that certain molecular weight polymer waxes may be used to modify petroleum oil by homogenizing a solution thereof through a temperature range at which the solution changes from a substantially clear transparent liquid to one which is of turbid or cloudy consistency, i.e. the cloud point. The product so formed is found to have high gel strength, good stability, and there is little tendency for the oil to separate.

It is an important object of this invention, therefore, to provide a method of forming high viscosity petroleum oil base products by modifying petroleum oil with certain polymer waxes.

It is also an object of the invention to provide a viscous composition having improved stability and consistency for use as a vehicle for medicaments, cosmetics and the like.

It is another object of this invention to provide a simple and economical method of forming an unctuous base composition by modifying petroleum oil with certain low molecular weight polyethylene compounds.

It is a further and specific object of this invention to provide a polyethylene-modified mineral oil product formed by a method which includes rapidly mixing a solution thereof through a temperature range at which the solution changes from a substantially clear, transparent liquid to one which is of turbid or cloudy consistency.

These and other objects may be realized in accordance with the present invention by heating a polymer wax with a petroleum oil to a temperature sufficient to melt the materials and then homogenizing the molten solution until it has cooled to at least 10° C. below the cloud point.

In the practice of the present invention the petroleum oil and polymer wax preparations are heated until a clear molten solution is obtained which has a viscosity slightly greater than that of the oil constituent thereof alone at the same temperature. After the solution is molten, it is removed from the heat and mixed to disperse the polymer wax throughout the mineral oil. Any suitable homogenizer mixer may be employed to disperse the polymer wax such as, for example, a colloid mill, various homogenizing mills, and the like. A mixer particularly useful for homogenizing the solution is a directional homo-mixer of the type disclosed by Fisher in U.S. Patent No. 2,393,360.

The molten polymer wax and petroleum oil solution is homogenized in the homo-mixer until it has cooled to a temperature of at least 10° C. below the cloud point of the mixture. Through operation of the homo-mixer this temperature differential has been found to be important for the production of a satisfactory product. When homogenization is halted within a temperature range less than 10° C. below the cloud point, a consistently uniform product is not obtained.

The cloud point is to be understood herein as that temperature at which the solution changes from a substantially clear, transparent liquid to one which is substantially cloudy. For simplicity, the range over which the clouding occurs will be referred to in the specification and claims as the cloud point. The temperature at which this phenomenon occurs varies with the molecular weight of the polymer wax. A polyethylene polymer wax, for example, having an average molecular weight of about 3,500 when present as a 10% polyethylene solution in molten mineral oil will have a cloud point of about 83° C. whereas a similar solution of polyethylene having an average molecular weight of about 10,000 will have a cloud point of about 90° C.

A slight increase in viscosity is also noted at the point when the solution changes from a clear liquid to one which is definitely cloudy. This slight increase in viscosity, however, does not represent the maximum viscosity of the product. The maximum viscosity of the product is realized after the material has aged and is usually within 24 hours after the homogenization step has been completed.

Although it is recognized that the initial mixing in a homogenizer or colloid mill may be continued as cooling proceeds to a temperature well below the 10° C. range, no material advantage accrues from such further rapid agitation. Therefore, after the mixture has cooled to 10° C. below the cloud point, a loop mixer, a propeller mixer, or the like may be used to stir in various additives as desired.

The polymer waxes which may be used to modify the petroleum oil in accordance with the present invention preferably include the microcrystalline waxes, although other waxes such as paraffin wax, beeswax, shellac wax and the like may also be employed. The most desirable waxes are those which have sharp melting points and which are readily compatible with the petroleum oil being modified. The preferred microcrystalline waxes are the polyethylenes and those derived from the Fischer-Tropsch synthesis which have a high melting point and about 50–55 carbon atoms per molecule. The polyethylenes usefully employed have either high or low densities and an average molecular weight of from 1,000 to about 20,000.

The amount of polymer wax used to modify the petroleum oil may vary over wide limits depending upon several factors such as the initial viscosity of the oil, the molecular weight of the polymer wax, and the character and quantity of the active materials which are added. Generally, the polymer wax constituent may be present in an amount from about 1% to about 5% by weight of the modified oil product to produce a product having the desired texture, viscosity and consistency A petroleum oil of any desired viscosity may be used in the practice of this invention and may include those which vary from a thin liquid to those which are so thick that they do not flow at ordinary temperatures. When the mineral oil is itself of high viscosity, the thickening effect may be of less importance than the advantages of product homogeneity. However, in forming modified oil base compositions for use in making salves, ointments, cosmetic creams and the like, a highly refined white oil having a viscosity of about 50–350 seconds at 38° C. and meeting the United States Pharmacopeia requirements as to taste, odor and acid tests is preferred.

With the addition of any given amount of polymer wax, the thickening effect produced in the modified oil is found to increase as the average molecular weight of the polymer wax increases. Generally, the low molecular weight polyethylenes in the molecular weight range of 1,000 to about 3,500 are preferred herein for production of a consistently desirable product. However, polyethylenes having an average molecular weight up to about 20,000 may also be employed. A practical and economical weight ratio of polymer wax which may be added to the petroleum oil to be modified is from about 2% by weight to about 20% by weight of the oil although higher and lower percentage amounts by weight may also be employed. The amount of polymer wax used to modify the petroleum oil is dependent upon the texture desired and the degree of stablility required in the ultimate product.

The modified mineral oils produced by the method of the present invention are physiologically inert and are useful both internally as vehicles for carrying medicaments and externally in preparing salves, ointments, cosmetic creams and the like. These modified oils are smooth, homogeneous and neutral while having a desirable consistency over a temperature range of from about −15° to about 60° C. This property also makes the modified petroleum oil useful, for example, as lubricants for industrial machinery in the food processing industries.

The modified petroleum oil as prepared herein is hydrophobic in character and not miscible with water. When water-absorptive properties are desired, addition of low percentages of a surface active agent may be made to the modified oil composition. Surface active agents usefully employed for this purpose include materials such as glyceryl or sorbitan monolaurate or oleate, the various polyoxyethylene sorbitan esters or the like. When a water-washable base is desired, hydrophilic agents such as fatty alcohol ethers of polyoxyethylene, fatty amine-polyoxyethylene condensates, fatty acid esters of polyoxyethylene and the like may be added in place of the surface active agents. When these various agents are included in a composition of the modified petroleum oil, the composition is found to be capable of holding a substantial quantity of water. Water soluble medicaments or various aqueous liquids intended for topical application may therefore be readily incorporated in the modified petroleum oil with the aid of these agents.

In dermatologic practice, the modified petroleum oils may be usefully combined with known medicaments which are readily compatible therewith such as, for example, ammoniated mercury, benzoic acid, chrysarobin, menthol, penicillin, salicylic acid, sulfathiazol, methyl salicylate, tannic acid, belladonna extract, boric acid, lanolin, isopropyl myristate, zinc oxide, hydrocortisone acetate, camphor, iodine, phenol, sulfur and the like. Various other ingredients for topical application may also be incorporated into the modified petroleum oil base.

The following examples are included in order to further illustrate the invention.

*Example 1*

A mixture of 8 grams of polyethylene (aver. M.W. 1500) and 92 grams of light mineral oil having a Saybolt viscosity of about 70 seconds at 38° C. are heated to 95° C. with mild agitation. When the polymer wax completely dissolves in the mineral oil, the solution is removed from heat and placed under a directional homo-mixer where is it is rapidly mixed until the solution has cooled to a temperature of at least 10° C. below the cloud point, or about 50° C. Thereafter, a conventional loop mixture is used to blend a quantity of perfume sufficient to impart a desirable fragrance to the modified mineral oil. The unctuous product formed by this procedure is thixotropic, homogeneous, and of smooth texture. The product retains its consistency without any substantial separation for periods up to one year under varying temperature conditions.

*Example 2*

The procedure of Example 1 is repeated using in place of the polyethylene a wax prepared by the Fischer-Tropsch synthesis having a melting point of about 215° F., an average molecular weight of about 750, and containing about 53 carbon atoms per molecule. The rapid agitation of the directional homo-mixer is continued until the product is cooled to 30° C. The unctuous product produced by this procedure is thixotropic, homogeneous and of smooth texture. This modified oil product has great utility as a lubricant oil for operations where the operating temperatures are below the cloud point.

*Example 3*

| | Parts by weight |
|---|---|
| Polyethylene (aver. M.W. 1500) | 8.0 |
| Mineral oil, heavy (viscosity 340–350 sec.) | 72.0 |
| Lanolin, anhydrous | 20.0 |
| Perfume | Q.s. |

The general procedure of Example 1 is repeated. The polyethylene, mineral oil and lanolin are rapidly mixed in a homo-mixer to a temperature at least 10° C. below the cloud point. Thereafter a conventional loop mixer is used to blend a quantity of perfume sufficient to impart a desirable fragrance to the modified mineral oil. The resulting unctuous product forms an excellent hair dressing composition.

Example 4

| | Parts by weight |
|---|---|
| Polyethylene, high density (aver. M.W. 1500) | 10.0 |
| Mineral oil, light technical (viscosity 65–75 sec.) | 90.0 |
| Perfume | Q.s. |

The procedure described in Example 1 is repeated with the above ingredients. The unctuous product is useful as a skin cleansing preparation.

Example 5

| | Parts by weight |
|---|---|
| Polyethylene (aver. M.W. 1500) | 10.0 |
| Mineral oil, light technical | 55.0 |
| Lanolin | 15.0 |
| Isopropyl myristate | 20.0 |
| Perfume | Q.s. |

The process similar to Example 1 is repeated with the isopropyl myristate and the perfume being added in the loop mixing step. The product is thixotropic, homogeneous and of smooth texture having great utility as an emollient.

Example 6

| | Parts by weight |
|---|---|
| Polyethylene (aver. M.W. 1500) | 8.0 |
| Mineral oil, light technical | 87.0 |
| Ammoniated mercury | 5.0 |

The process similar to Example 1 is repeated with the ammoniated mercury being added in place of the prefume during the loop mixing step. The unctuous product formed is an excellent topical ointment for treatment of dermatological conditions. This ointment exhibits excellent application characteristics and when in contact with the skin shows little tendency to spread to extraneous areas. The medicament contained in the ointment is readily available for absorption by the skin.

Example 7

| | Parts by weight |
|---|---|
| Polyethylene (aver. M.W. 1500) | 10.0 |
| Mineral oil, light technical | 70.0 |
| Zinc oxide | 20.0 |

The process similar to Example 1 is repeated with the zinc oxide being added during the loop mixing step. The product formed has similar characteristics as the product formed in Example 6.

Example 8

| | Parts by weight |
|---|---|
| Polyethylene (aver. M.W. 1500) | 10.0 |
| Mineral oil, light technical | 89.5 |
| Hydrocortisone acetate | 0.5 |

The procedure of Example 1 is repeated with the hydrocortisone acetate added during the loop mixing step. The product formed has similar characteristics as the product formed in Example 6.

Example 9

| | Parts by weight |
|---|---|
| Polyethylene (aver. M.W. 2000) | 10.0 |
| Mineral oil, light technical | 74.5 |
| Methyl salicylate | 15.0 |
| Camphor | 0.5 |

The procedure of Example 1 is repeated with the methyl salicylate and the camphor being added to the modified oil during the loop mixing step. The product formed is useful as an analgesic rub and has similar characteristics as the product formed in Example 6.

Example 10

| | Parts by weight |
|---|---|
| Polyethylene (aver. M.W. 2000) | 10.0 |
| Mineral oil, light technical | 85.0 |
| Polyethylene glycol 300 monolaurate | 5.0 |

The general procedure of Example 1 is repeated with all of the above constituents being blended in the rapid mixing step. The product formed is useful as a hydrophilic ointment base.

Additional materials such as perfumes, coloring, and the like, although not necessary to or essential parts of the present invention may be added to the unctuous base in relatively small quantities as desired.

It is understood that the foregoing detailed description is given merely by way of illustration and that many variations may be made therein without departing from the spirit of the invention.

What is claimed is:

1. A method for the preparation of an unctuous base which comprises, heating a mixture of white petroleum oil with a minor amount of polyethylene having an average molecular weight of 1,000 to about 20,000 and homogenizing the molten mixture while cooling to a temperature at least 10° C. below the cloud point.

2. A method for the preparation of an unctuous base which comprises, heating a mixture of white petroleum oil with a minor amount of polyethylene having an average molecular weight less than 3,500 and homogenizing the molten mixture while cooling to a temperature at least 10° C. below the cloud point.

3. The method of making an unctuous composition containing white petroleum oil and polyethylene having an average molecular weight of from 1,000 to about 20,000 which comprises, preparing a solution of said polyethylene in said petroleum oil by heating same to a temperature sufficient to produce a substantially clear liquid and homogenizing the molten mixture while cooling to a temperature at least 10° C. below the cloud point.

4. A method for the preparation of an unctuous base which comprises, heating a mixture of white petroleum oil with a minor amount of polymer wax derived from the Fischer-Tropsch synthesis having about 50–55 carbon atoms per molecule, a melting point of about 215° F., and an average molecular weight of about 750, and homogenizing a molten mixture thereof while cooling to a temperature at least 10° C. below the cloud point.

5. A method for the preparation of a composition having improved consistency and stability characteristics which comprises, forming a solution of polyethylene polymer wax in mineral oil at a temperature above the cloud point of said solution, said polyethylene having an average molecular weight of less than 4,000, and homogenizing the molten mixture while slowly cooling to a temperature at least 10° C. below the cloud point.

6. The method of preparing a medicinal composition having improved consistency and stability characteristics which comprises, forming a solution of the medicament, polyethylene polymer wax having an average molecular weight of about 3,500, and mineral oil and homogenizing the molten mixture while naturally cooling to a temperature at least 10° C. below the cloud point.

7. The method as in claim 6 wherein the medicament is hydrocortisone acetate.

8. The method as in claim 6 wherein the medicament is ammoniated mercury.

9. The method as in claim 6 wherein the medicament is zinc oxide.

10. The method as in claim 6 wherein the medicament is methyl salicylate.

11. The method of preparing a hairdressing composition having improved consistency and stability characteristics which comprises, heating a mixture consisting of a major portion of mineral oil with a minor portion of polyethylene and lanolin, said polyethylene having an average molecular weight less than 3,500, homogenizing the molten mixture while naturally cooling to a temperature of at least 10° C. below the cloud point, and blending into said homogenized mixture a quantity of perfume sufficient to impart a desirable fragrance thereto.

12. A method for the preparation of an unctuous base which comprises, heating a mixture of white petroleum oil with a minor amount of polyethylene having an average molecular weight of 1,000 to about 20,000, to a temperature above the melting point of the mixture and subjecting the molten mixture to homogenization while simultaneously cooling the mixture to a temperature at least 10° C. below the cloud point of the mixture.

References Cited by the Examiner

UNITED STATES PATENTS

| | | | |
|---|---|---|---|
| 2,628,187 | 2/53 | Frohmader | 167—82 |
| 2,628,205 | 2/53 | Shoemaker | 167—63 |

OTHER REFERENCES

Abbe: The Pharmaceutical Journal, 183 (5000), pp. 111–115.

Carbowax Polyethylene Glycols, Union Carbide, New York, New York, 1958, 51 pp., pp. 3 and 18 relied on.

Headlee: JAPA, Practical Pharmacy Edition, July 1958, pp. 426–429.

Mutimer et al.: JAPA, Scientific Edition, February 1956, pp. 101–105.

Plastibase Pamphlet, 13 pp., October 1954, pp. 1 and 13 relied on.

Sagarin: Cosmetics—Science and Technology, Interscience Publishers, Inc., New York, N.Y., pp. 554–559.

JULIAN S. LEVITT, *Primary Examiner.*

FRANK CACCIAPAGLIA, JR., *Examiner.*